Patented Jan. 16, 1934

1,943,423

UNITED STATES PATENT OFFICE 1,943,423

RUBBER ADHESIVE

Walter W. Dunfield, Yonkers, N. Y., assignor to The Naugatuck Chemical Company, Naugatuck, Conn., a corporation No Drawing. Application January 25, 1929
Serial No. 335,152

6 Claims. (Cl. 87—17)

This invention relates to an adhesive and the method of making the same. More particularly this invention relates to an adhesive adapted to unite rubber to metal.

Heretofore various methods and materials have been employed to unite rubber to metal. For instance an ordinary hard rubber cement has been applied to a sandblasted surface of metal and a sheet of rubber rolled thereon, the whole being vulcanized so as to form a unit. Another method has been to electroplate a sandblasted metal surface with copper or alloys and unite rubber thereto by vulcanization under pressure. Still another method used to unite rubber to metal has been to employ the substance disclosed in the patent to H. L. Fisher, 1,605,180 in the same way as hard rubber cement is used.

These previous methods are objectionable in that a satisfactory bond especially at high temperatures is not obtained. In the case of the use of the hard rubber cement, the vulcanization process often causes the top layer of rubber to become overcured in the surface adjacent the metal which weakens the bond and causes rapid deterioration of the rubber. The plating process is expensive in the sense that it requires considerable equipment.

It is the object of my invention to provide a new adhesive which is inexpensive to manufacture, which provides a stronger bond between metal and rubber and which may be used to unite either soft or hard rubber to metal or other materials such as wood, and also either to hard rubber or soft rubber.

It is an object of my invention to provide an adhesive, one constituent of which is previously melted rubber. Another object of my invention is to provide a material by means of which rubber and metal may be united by vulcanization. It is also the object of my invention to provide a method for treating rubber whereby it may be made into an improved adhesive, and it is a further object of my invention to provide a method whereby melted rubber may be combined with other materials to make a strong adhesive economically.

Broadly stated, my invention consists in treating rubber at elevated temperatures for a considerable period of time sufficient to melt or depolymerize the rubber, thereby changing it into a material having strong adhesive properties when vulcanized. The thus treated material is mixed with the proper vulcanizing ingredients and as such may be used to unite rubber and metal by vulcanization. The material is preferably applied in the form of a cement, in a manner well known in the art. However, it is advantageous to add to the mixture of melted rubber and vulcanizing ingredients a naphtha solution of rubber which tends to increase the viscosity of the cement mixture and to prevent the adhesive from flowing at temperatures such as are used in vulcanization.

In the particular method of preparing the melted rubber, a portion of the rubber, which may be either broken down or unbroken down, is heated in a container preferably closed and provided with a long reflux. This heating process is carried on at a temperature of approximately 300° C., although it may be varied somewhat therefrom, the range of temperature being 180° C. to 300° C. This heating process may be carried on for a period of from 10–20 hrs. with successful results, although the time found to be most suitable is approximately 18 hrs. To the melted rubber, sulphur either in large or small percentages is added, and an appropriate accelerator, such as heptene base, which is the condensation product of heptaldehyde and aniline, and zinc oxide are added and mixed in a paint or grinding mill. This product may be used to unite metal to rubber by spreading the product over the cleaned surface of the metal, rolling the sheet of rubber thereover and vulcanizing the whole. However, due to the low viscosity of a cement mixture of melted rubber and vulcanizing ingredients, it is advantageous to add a solution of pure gum rubber in benzol or a rubber cement such as naphtha cement which increases the viscosity of the mixture and renders the adhesive less liable to flow during the vulcanizing operation. If convenient, the vulcanizing ingredients such as sulphur, accelerator, and zinc oxide may be added to the naphtha cement and this mixture then added to the melted rubber.

In specific instances the following proportions of the constituents of the adhesive have been employed with satisfactory results.

*Example 1*

| | Parts by weight |
|---|---|
| Melted rubber | 100 |
| Sulphur | 50 |
| Zinc oxide | 10 |
| Heptene base | 3 |
| Rubber (as naphtha cement) | 20 |

Example 2

| | Parts by weight |
|---|---|
| Melted rubber | 100 |
| Sulphur | 25 |
| Zinc oxide | 10 |
| Heptene base | 1 |
| Rubber (as naphtha cement) | 15 |

Example 3

| | Parts by weight |
|---|---|
| Melted rubber | 100 |
| Sulphur | 5 |
| Zinc oxide | 10 |
| Tetramethylthiuram-disulphide | 3 |
| Rubber (as naphtha cement) | 10 |

In carrying out the process of uniting rubber to metal, the unit made up of metal base, the intermediate layer of adhesive, and the top layer of rubber, may be vulcanized either in a mold, or in open heat, or steam under pressure, or in exhaust steam.

The adhesive above described used in the process described has been found to unite rubber to rubber either hard or soft, rubber to metal or rubber to other materials such as wood very satisfactorily.

While the invention has been described in detail, it is not intended to so limit it inasmuch as variations in the ingredients making up the adhesive, in the process of preparing the melted rubber, and in the process of combining the ingredients to form the adhesive may all be varied within limits as well understood by one skilled in the art. Therefore it is not intended to limit my invention otherwise than by the prior art and the scope of the following claims.

Having thus described my invention what I claim and desire to protect by Letters Patent is:

1. An adhesive compound comprising previously melted rubber, rubber, a solvent and vulcanizing ingredients.

2. In the art of making adhesives, the steps of heating rubber at 180–300° C. for more than 10 hrs. and mixing rubber cement therewith.

3. In the art of making adhesives, the steps of heating rubber for more than 10 hrs., and mixing rubber cement and vulcanizing ingredients therewith.

4. In the art of making adhesives, the steps of heating rubber from 10–20 hrs. at temperatures in the neighborhood of 300° C., mixing the thus treated rubber with vulcanizing ingredients and rubber cement.

5. An adhesive material comprising previously melted rubber, vulcanizing ingredients, and a solvent.

6. An adhesive material comprising previously melted rubber, about 10–20 parts of unmelted rubber to 100 parts of previously melted rubber, vulcanizing ingredients, and a solvent.

WALTER WILLIAM DUNFIELD.